United States Patent Office 2,949,426
Patented Aug. 16, 1960

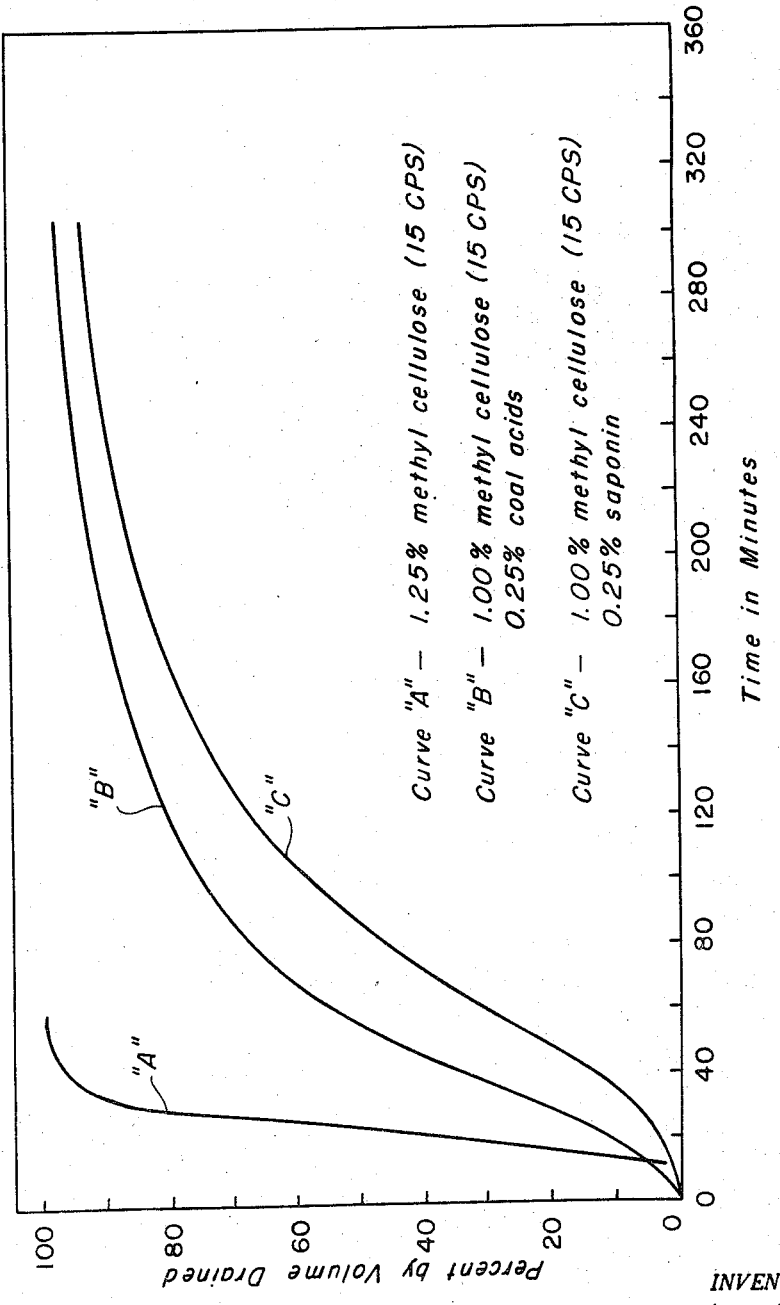

2,949,426

STABILIZED FOAM-PROVIDING COMPOSITIONS

Bernard J. Thiegs, Midland, Mich., assignor to The Dow Chemical Company, Midland, Mich., a corporation of Delaware Filed May 21, 1957, Ser. No. 660,671

5 Claims. (Cl. 252—307)

This invention has reference to a novel stabilizing agent or additament for foams that have been spumed either by internal chemical generation of a gaseous propellant or blowing agents or by suitable pneumatic or mechanical means from an aqueous, foam-providing composition.

There are many vital uses for foams that have been obtained from aqueous foam-providing compositions. Firefighting and fugitive insulation are prominent among the possible applications of such materials. In general, and as is indicated by J. J. Bikerman in his work entitled "Foams: Theory and Industrial Applications," Reinhold Publishing Co., N.Y. (1953), foams may be generated from aqueous solutions or dispersions of spumiferous materials in one of two major ways. They may be obtained, as has been indicated, as a result of an effervescing gas that functions as a propellant or blowing agent and which is internally produced through the chemical reaction of various constituents in certain kinds of foam-providing compositions. Such foams, which may be characterized as being "chemical" foams, are typified by the well known sodium bicarbonate-aluminum sulfate variety of compositions that are utilized as fire-fighting implements. Other varieties of foams, typified by those obtained from aqueous solutions of hydrolyzed proteins and the like, may be characterized as being "mechanical" foams. The last mentioned type of foam requires to be spumed by mechanical frothing, bubbling or agitating techniques (including ebullition) wherein air or another gas or vapor is employed to force the foam-providing composition into a three-dimensional foam structure. In either event, it is necessary for the foam-providing composition to contain at least one constituent that is spumable in aqueous dispersion and adapted in such form to provide the continuous phase that constitutes the walls of the cells or bubbles in the foam products derived therefrom.

Many materials are spumiferous in aqueous dispersion and are capable of providing plenteous, three-dimensional foam structures upon the frothing, by one means or another, of their aqueous dispersions. Most of these materials are actually water-soluble. A fair proportion of them are polymeric in nature. Very few of the materials that are spumiferous in aqueous dispersion, however, are inherently adapted to provide efficacious and longeval foam structures. To overcome this, it is common to utilize stabilizing ingredients in foam-providing compositions in order to augment the lasting qualities and prolong the life span of foam structures that may be generated therefrom. A variety of foam stabilizers are known and have been employed. Some of these have been discussed, for example, in Bikerman's treatise, supra, and in a comprehensive series of articles that are to be found in Industrial and Engineering Chemistry, vol. 18, No. 11 (November 1956) at pages 2012-2051. By way of specific illustration, saponin has been disclosed in U.S. Patent No. 1,507,943 as an effective stabilizer for "chemical" foams of the sodium bicarbonate-aluminum sulfate type. And the same material has been disclosed as being extremely advantageous as a stabilizer in certain novel foam-providing compositions of particular non-proteinous, water-soluble, long-chain polymers in the copending application of Bernard J. Thiegs for "Stable Foam Compositions" having Serial No. 634,196, which was filed on January 15, 1957.

Despite its general efficacy as a stabilizer for foams from aqueous foam-providing compositions, saponin is a relatively expensive material, even when it is obtained in its most economical form. The same applies to certain other conventionally employed foam stabilizers, including certain licorice root extracts that are commonly used for such purpose. It would be advantageous, and it is the principal objective of the present invention, to provide novel, effective and exceptionally economical stabilizing agents for a wide variety of the various aqueous foam-providing compositions that are available. It would be equally advantageous, and it is also an object of the invention, to provide the utile aqueous foam-providing compositions that contain such a beneficial stabilizing additament and the long lasting foam structures generated therefrom. The attainment of these ends and corollary objectives of the invention, as well as its many salient features and advantages will be manifest in the description and specification following.

The invention comprehends the utilization of the polycarboxylic acids that may be obtained upon or from the oxidation of coal and the like carbonaceous substances (hereinafter referred to as "coal acids") as the stabilizing agent for or the stabilizing ingredient in aqueous foam-providing compositions that contain at least one constituent, in conventional amounts, that is spumiferous in aqueous dispersion, which compositions, for maximum benefit, are not capable of neutralizing or forming salts of or with the free coal acids additament. It is usually of greater desirability, as will hereinafter appear, for the aqueous, coal acid-containing, foam-providing compositions to have a pH in the acidic ranges below neutral, especially when their pH values are less than about 4.

The free coal acids may advantageously be employed in most of the "mechanical" type foams that are adapted to be spumed by known pneumatic techniques or other external and mechanical means (including ebullition) into three-dimensional foam structures. These include the known proteinous and other materials that are mechanically spumiferous in aqueous dispersion or solution, including (but not being limited by) most of those polymeric materials that have been disclosed in the referred-to copending application and which are also adapted to advantageously be stabilized by saponin. The latter materials, in particular, are certain of the water-soluble cellulose ether derivatives (especially in the lower viscosity grades that are rated as less than about 100 centipoises materials) such as methyl cellulose, ethyl cellulose and others that are adapted to provide one percent by weight aqueous solutions whose surface tensions, measured at about 25° C., are less than about 60 dynes per centimeter.

The free coal acids may also be employed with great advantage to stabilize "chemical" type foams including the conventional sodium bicarbonate-aluminum sulfate types and the like. In order to achieve maximum benefit when they are being so utilized, care should be taken to avoid neutralizing the free coal acids with any basic ingredients that may be present and used in and during generation of the foam-forming gas. This may be accomplished readily by mixing the coal acids with the non-basic constituent of the "chemical" foam-providing composition that is chemically inert or relatively-so to the coal acids. In this way, the stabilizing agent is left in the free acid form to serve its intended function of prolonging the life and enhancing the physical characteristics of the foam structure that is generated from the composition after the gas-supplying reaction has been accomplished with a constituent that might possibly react with the free coal acids to cause their neutralization by forming salts therewith. Thus, in a sodium bicarbonate-aluminum sulfate system, the free coal acids additive may be incorporated in the alum solution wherein it remains unneutralized and available to stabilize the foam that is formed upon the gas-generating reaction between the aluminum sulfate and the sodium bicarbonate.

While the coal acids are adapted to stabilize foams that have been spumed from a wide variety of aqueous foam-providing compositions, the benefit of their employment, for reasons that are not clearly apparent, is much more pronounced with certain varieties of foam-providing materials than others. For example, the improvement which may be noted in the stability and increased longevity of polyvinyl alcohol foams is relatively slight in comparison with that which may be obtained when the coal acids are used for stabilizing many other foam-providing compositions, particularly proteinous materials and large numbers of the cellulose ether derivatives, especially water-soluble methyl cellulose and the like. Likewise, many of the water-soluble conventional surface active detergent materials that are adapted to provide aqueous solutions which can be mechanically generated into foams of the quick-draining variety are not significantly benefited or stabilized by the employment of coal acids. Despite this, however, and regardless of the achievement of only relatively small improvements in certain specific and isolated instances, the employment of coal acids as a foam stabilizer does not ordinarily operate to diminish or destroy the foam-providing ability of any spumiferous aqueous composition, particularly when it is of the type that is substantially non-reactive with coal acids.

The concentration of the free coal acids that is employed in the aqueous foam-providing composition may advantageously be a minor proportion, generally between about 0.05 and 5 percent by weight, based on the weight of the composition, in order to obtain stable and long-lasting derivative foams from the composition. Of course, the relative degree of stability may depend somewhat upon the particular foam-providing composition that is employed as well as the relative proportion of the free coal acids that is incorporated in the composition. Generally, the invention may be practiced with greatest efficacy when the aqueous foam-providing compositions and the foams that are generated therefrom contain an amount by weight of the free coal acids as a stabilizing additament that is between about 0.25 and 1 percent.

It is ordinary to employ more than 0.25 and less than about 25 percent by weight of the spumiferous constituent in the foam-providing composition and quite often, amounts between about 0.5 and 10 percent by weight of such constituents are found to be suitable.

The free coal acids that are employed with such advantage as the stabilizing agent in and for the aqueous foam-providing compositions of the invention may be identical with or similar to those which may be obtained by the oxidation with gaseous oxygen, which may be contained in the air, of an aqueous alkaline slurry of a finely divided carbonaceous material selected from the group consisting of coal and coke that has been obtained by carbonization of coal at temperatures beneath about 700° C. Coal acids that have been obtained by the nitric acid oxidation of suitable carbonaceous materials are also generally satisfactory. Such coals that are of the varieties known as anthracite, bituminous, sub-bituminous and lignite and other low grade coals are ordinarily suitable for the production of coal acids. Satisfactory cokes are those produced according to conventional techniques from coal at a temperature beneath about 700° C. The utilization of higher coking temperatures frequently causes the cokes that are obtained to be graphitic and rendered unsuitable for conversion to coal acids in satisfactory yields.

The free coal acid product is a hygroscopic, essentially water-soluble material that usually has a predominantly yellowish coloration. It is believed to be substantially comprised of various aromatic polycarboxylic acids. The average molecular weight of the coal acids that are ordinarily obtained is frequently in the neighborhood of 250. Their average equivalent weight is generally about 80. They ordinarily appear to have an average of about two and one-half to five carboxylic groups per molecule with an apparent average of about three to four being common. While their exact chemical nature and constitution may be somewhat conjectural, they evidently contain considerable quantities of tri- and tetra-carboxylic benzene acids as well as aromatic acids having more complex nuclei. Frequently, for example, the greatly preponderant proportion of aromatic nuclei obtained in coal acids that have been prepared and obtained in the described fashion have been found to consist of methyl-naphthalene, benzene, biphenyl, naphthalene, phenanthrene, alkyl benzene, benzophenone and toluene nuclei. As is apparent, the free coal acids are a relatively inexpensive and economically attractive material.

The invention is further illustrated in and by the following examples wherein, unless otherwise indicated, all parts and percentages are to be taken by weight.

EXAMPLE I

A foam-providing composition was prepared by dissolving about 2.5 parts of free coal acids having an average molecular weight of about 250 and an apparent equivalent weight of about 80 and 10 parts of methyl cellulose in 1000 parts of water. The methyl cellulose that was employed was of the 15 centipoise viscosity grade, as determined with a 2 percent aqueous solution of the cellulose ether at about 20° C. The composition was formulated by separately dissolving each of the solid ingredients in about half the total quantity of water before mixing them together. The methyl cellulose solution was made up according to conventional procedure by first adding the dry cellulose ether to about one-third of the half-total quantity of water. This portion was heated to about 85° C. in order to initially disperse the cellulose ether. After about five minutes the balance of the half-total quantity water was added at room temperature with continued stirring to achieve complete dissolution of the ether. The separately prepared coal acids and cellulose ether solutions were then mixed together. The pH of the resulting free coal acids-containing foam-providing composition was about 2.5.

A very stable mechanical foam was generated from the resulting solution by spraying it, in an enclosing duct, against a double layer of 100 mesh (U.S. standard sieve series) copper screen having a diameter of one and three-eighths inches through which about thirty to forty cubic feet per minute of air were being simultaneously forced by a high speed fan capable of producing a static pressure in a closed system equal to about a seventeen inch head of water. The stability of the foam was measured by filling a plastic tray (having dimensions of about three and one-quarter by eleven by thirteen inches) with it and observing the time that was required for it to break. During the test, the tray was left uncovered to expose the deposited foam to air. After more than eight hours, the surface of the foam was observed to remain in an unburst condition. Rather, it had dried out, leaving a dry skeleton of foam lamellae having a good continuity pattern after the originally deposited foam structure. When the foam product was deposited over a burning, one inch thick layer of gasoline that was being floated on about five inches of water in an iron box having about five square feet of surface area, it quickly extinguished the flames.

Commensurate excellent results were obtained with other free coal acid-stabilized methyl cellulose solutions that contained up to one percent of the coal acids and from one to two percent of the cellulose ether in individually varying compositions.

In a similar manner, to illustrate a contrast with the foregoing, it was attempted to produce a foam from a one percent aqueous solution of 15 centipoise methyl cellulose that did not contain any free coal acids and which had a substantially neutral pH of about 7. A good volume of foam was initially produced but the spumous product had very poor stability. It commenced to collapse immediately upon its formation and within approximately half-an-hour was completely gone from the tray despite the initially complete filling thereof.

EXAMPLE II

In order to illustrate the effect of the pH of the aqueous composition on the stability of coal acid-containing foam compositions, a series of foams were prepared which consisted of aqueous solutions of methyl cellulose (similar to that employed in Example I) and coal acids, some of which solutions were partially neutralized with various basic materials, including sodium hydroxide, calcium hydroxide and triethanolamine. In each case the aqueous solution that was employed contained about 1 percent of the cellulose ether and 0.25 percent of the free coal acids. The results are set forth in the following table in which composition "A" was a control wherein the coal acids remained in unneutralized condition; compositions "B," "C" and "D" were partially neutralized to the various indicated levels of pH with sodium hydroxide; composition "E" was partially neutralized with calcium hydroxide; and composition "F" with triethanolamine. All of the foams from the various compositions were evaluated in a manner similar to that discussed in Example I.

*Table 1.—Effect of pH on stability of methylcellulose foams*

| Composition | pH of Aqueous Foam-Providing Composition | Longevity of Foam |
|---|---|---|
| "A" | 2.6 | More than 4 hours—foam dries out on surface. |
| "B" | 3.5 | 2 to 3 hours—less stable than foam from Composition "A". |
| "C" | 4.9 | About 45 minutes. |
| "D" | 11.3 | Do. |
| "E" | 4.6 | Do. |
| "F" | 4.9 | Do. |

EXAMPLE III

Free coal acids used to stabilize a water soluble, spumiferous aqueous composition of a hydroxypropyl methyl cellulose ether derivative (which had been obtained under the trade-designation "Methocel 90 HG" from The Dow Chemical Company of Midland, Michigan) provided excellent results, commensurate with those in the first example when the amounts of the coal acids that were employed were varied from quantities of one-quarter to one percent in one percent aqueous solutions of the cellulose ether. To specifically illustrate, a foam that was prepared from an aqueous solution of one percent "Methocel 90 HG," being of the viscosity grade of about 30 centipoises, and one-quarter percent of coal acids generated in the same way as set forth in the first example provided a foam having a life-time longer than 4 hours, after which the surface of the foam was observed to have remained in an unburst condition and to have dried out to a dry cellular structure.

In comparison, the lifetime of a foam prepared from a one percent aqueous solution of the same methyl cellulose without any coal acids having been incorporated therein which was generated in the same manner was found to be only about 30 minutes.

EXAMPLE IV

A solution of one percent of low viscosity carboxymethyl methyl cellulose ("Methocel CAM") in water was found, when tested according to the foregoing procedure, to have poor foamability. The plain solution did not expand well and provided a foam that broke instantly upon its formation. When about one-quarter of one percent of coal acids was added to the aqueous solution of the cellulose ether, however, it was spumable in the indicated manner into a foam structure that had a stability of at least 20 minutes.

EXAMPLE V

In a similar manner to the foregoing, free coal acids used to stabilize water soluble, spumiferous hydrolyzed protein solutions provided very good results when employed in quantities of from one-quarter to one percent of the coal acids in aqueous solutions of the protein having various concentrations. To illustrate specifically, an aqueous composition was prepared containing about 25 milliliters of a hydrolyzed vegetable protein (having a dissolved solids content of about 52 percent) and 75 milliliters of water to which there was added about one gram of free coal acids. Foam produced from this composition in the manner set forth in Example I and evaluated in the same was as therein described was found to have a lifetime of at least 30 minutes. In contrast with this, an identical aqueous composition of the hydrolyzed protein and water which did not contain the free coal acids provided a foam whose lifetime was observed to be less than 5 minutes when generated and evaluated in the same manner.

Similar excellent results may be obtained with mechanically spumiferous aqueous solutions of many other water-soluble proteinous substances.

EXAMPLE VI

The drainage characteristics of various foams were determined by a procedure which involved filling specially prepared drainage tubes with the individual compositions expanded into foam by the procedure of Example I and measuring the percentage by volume of foam that had drained off after regular intervals. Each of the drainage tubes was fabricated from glass. They were three inches in diameter and nineteen and one-half inches in length. They were each provided with graduated and tapered lower portions extending about four and one-half inches and funneled upwardly from their bottoms to facilitate determination of the volume of liquid drained from the foam. In order to prepare the tubes, thirty milliliter centrifuge tubes were joined to fifteen inch lengths of three inch glass tubing. The total volume of each drainage tube was about one and seven-tenths liters. During the tests, each of the tubes were filled from the bottom up (through an injection extension conduit) with the foamed compositions until about a twelve to fourteen inch height of foam was attained.

One of the foams tested (foam "B") was in accordance with the present invention and contained about one percent of 15 centipoise viscosity grade of methyl cellulose and one-quarter of one percent of free coal acids dissolved in water. For purposes of comparison, another foam (foam "A") that was prepared and tested contained only about one percent of the cellulose ether with no stabilizing additament. A third foam (foam "C"), of excellent stability and in accordance with the foams of the referred-to copending application, was also included in the test. It was an aqueous solution of about one percent of the cellulose ether and one-quarter of one percent of saponin. The results that were obtained are included in the following tabulation and plotted graphically in the figure of the accompanying drawing,

*Table 2.—Drainage rates of various foams*

| Time, In Minutes | Percent By Volume Drained | | |
|---|---|---|---|
| | Foam "A" | Foam "B" | Foam "C" |
| 10 | 2.9 | 1.3 | |
| 15 | 15.0 | | |
| 20 | 36.7 | 11.1 | 2.0 |
| 25 | 65.8 | | |
| 30 | 81.2 | 22.2 | 7.3 |
| 35 | 91.7 | | |
| 40 | 95.9 | 33.3 | 13.2 |
| 45 | 98.0 | | |
| 60 | 98.0 | 54.0 | 27.8 |
| 80 | | 66.7 | 43.0 |
| 100 | | 75.5 | 56.1 |
| 120 | | 80.3 | 65.9 |
| 140 | | 84.2 | 71.8 |
| 160 | | 87.3 | 75.6 |
| 180 | | 88.9 | 80.5 |
| 240 | | 95.3 | 90.4 |
| 300 | | 98.4 | 92.6 |

EXAMPLE VII

In order to demonstrate the efficacy of free coal acids as a stabilizer for "chemical" type foams of the sodium bicarbonate-aluminum sulfate type, three compositions were prepared which employed the foam-providing chemicals in the standard proportions of about 0.3 pound of the aluminum sulfate, $(Al_2SO_4)_3 \cdot 18H_2O$, per 1⅜ pounds of sodium bicarbonate, $NaHCO_3$, per each two gallons of water. For each composition, the quantities actually employed were sufficient to make up about a 200 milliliter volume and consisted of separate solutions of (a) about 7.0 grams of the alum dissolved in about 50 milliliters of water and (b) about 16.6 grams of the bicarbonate of soda dissolved in about 150 milliliters of water. When these solutions are brought together, the well-known gas generating reaction occurs which effervesces or froths to form the desired foam from the combined foam-providing composition. However, unless a stabilizing agent is present in the resulting foam structure, the spumous product lasts for only a short time; usually not long enough to afford practical value.

This was shown by the results of the composition designated "D" in which the alum and bicarbonate solutions were directly mixed together without incorporating any additive in either. The mixture did not form foam. After a brief, initial effervescense which persisted for only several seconds, only the original total liquid volume of about 200 milliliters remained. In the second composition, designated "E," about a gram of saponin was dissolved in the alum solution before mixing it with the bicarbonate. A tight, stable foam occupying a volume of about 1400 milliliters and persisting for about an hour was formed. The third composition, designated "F," was prepared according to the present invention by adding about a gram of free coal acids to the alum solution before mixing it with the bicarbonate. A good quantity of longeval foam was obtained. Its volume was between 1600 and 1700 milliliters. While structurally, the foam from composition "F" was not quite as tight as the saponin stabilized foam from composition "E," it persisted for a considerable period of time (more than half-an-hour) in comparison.

Results that are analogous to those illustrated in the foregoing examples may be obtained when free coal acids are employed to stabilize other aqueous foam-providing compositions of spumiferous materials. Generally, to ensure this (as is apparent in the foregoing), it is best to employ the coal acids in compositions and foams resulting therefrom that have a pH which is acidic, particularly when their pH has a value that is less than about 4.

Certain changes and modifications in the practice of the present invention can obviously be made without departing substantially from its intended spirit and scope. As a consequence, the invention is not intended to be limited or otherwise restricted to or by the preferred docent embodiments thereof with which the foregoing description and specification are delineated. Rather, it is to be interpreted and construed in the light of what is set forth and defined in the hereto appended claims.

What is claimed is:

1. Stabilized foam-providing composition comprising water in which there is incorporated between about 0.25 and 25 weight percent, based on composition weight, of a spumiferous material selected from the group consisting of (a) water-soluble proteinous materials and (b) water-soluble cellulose ether derivatives that are relatively non-polar and adapted to provide a one percent aqueous solution at about 25° C. having a surface tension less than about 60 dynes per centimeter and a minor proportion of between about 0.05 and 5 weight percent, based on composition weight, of coal acids, which coal acids have an average molecular weight of about 250, an average equivalent weight of about 80, and contain an average of from about 2.5 to 5 carboxylic groups per aromatic nucleus in their molecule, said composition having a pH that is acidic.

2. The composition of claim 1, containing between about 0.25 and 1 percent by weight of the coal acids.

3. The composition of claim 1 having a pH that is less than about 4.

4. Stabilized foam-providing composition comprising water in which there is dissolved between about 0.5 and 10 percent by weight of a water-soluble cellulose ether derivative that is mechanically spumiferous in aqueous solution and which is relatively non-polar and adapted to provide a one percent aqueous solution at about 25° C. having a surface tension less than about 60 dynes per centimeter and between about 0.05 and 5 percent by weight of free coal acids, both based on the weight of the composition, which coal acids have an average molecular weight of about 250, an average equivalent weight of about 80, and contain an average of from about 2.5 to 5 carboxylic groups per aromatic nucleus in their molecule.

5. Stabilized foam-providing composition comprising water in which there is dissolved between about 0.5 and 10 percent by weight of methyl cellulose of a viscosity grade that is less than about 100 centipoises and between about 0.05 and 5 percent by weight of free coal acids, both based on the weight of the composition, which coal acids have an average molecular weight of about 250, an average equivalent weight of about 80, and contain an average of from about 2.5 to 5 carboxylic groups per aromatic nucleus in their molecule.

References Cited in the file of this patent

UNITED STATES PATENTS

| 1,981,506 | Hansen | Nov. 20, 1934 |
| 2,289,688 | Wright | July 14, 1942 |
| 2,555,410 | Howard | June 5, 1951 |

FOREIGN PATENTS

| 954,942 | France | Jan. 3, 1950 |

OTHER REFERENCES

Chemical Abstracts, vol. 19, pp. 1076, 1077 (1925), article by Bartsch.